UNITED STATES PATENT OFFICE.

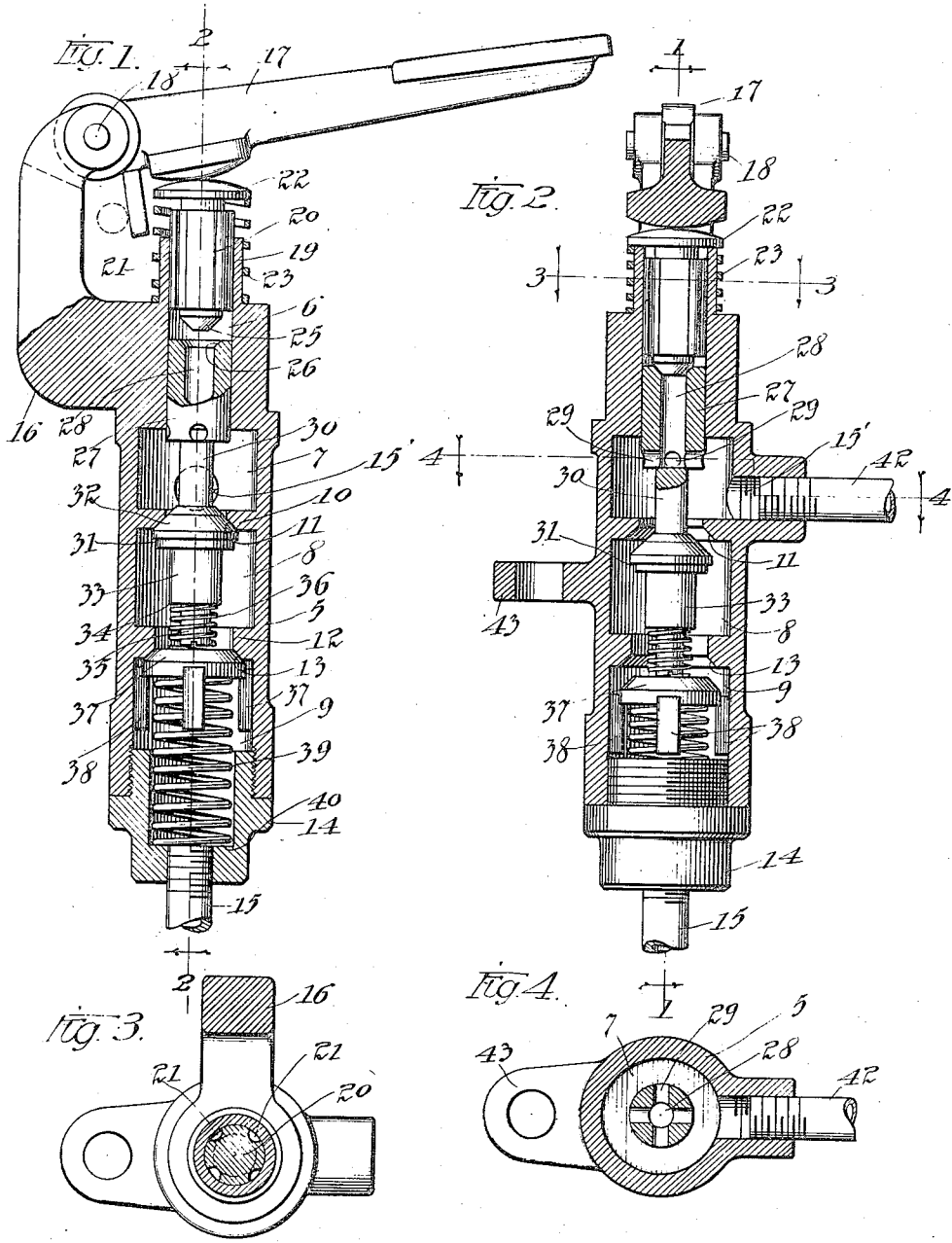

JOHN DESMOND, OF WILMETTE, ILLINOIS, ASSIGNOR, BY MESNE ASSIGNMENTS, TO TAYLOR MANUFACTURING COMPANY, A CORPORATION OF ILLINOIS.

VALVE.

1,144,758.  Specification of Letters Patent.  Patented June 29, 1915.

Application filed June 15, 1914. Serial No. 845,195.

*To all whom it may concern:*

Be it known that I, JOHN DESMOND, a citizen of the United States, residing at Wilmette, in the county of Cook and State of Illinois, have invented certain new and useful Improvements in Valves, of which the following is a specification.

My invention relates to improvements in valves and has especial reference to valves adapted to control receptacles containing air, gas or other like fluids under pressure.

One of the objects of my invention is to provide a valve structure that is adapted to be easily and quickly operated, the valves of which are capable of closing tightly, whereby to control air, or other fluid under pressure, and to hold them securely and prevent leaking when the plural valve is closed.

Another object of my invention is to provide a plural valve mechanism which, when moved in one direction will permit air, under pressure to pass from one receptacle to another and which, when moved in the opposite direction, will close or permit closure of the passage-way between the said receptacles and to subsequently open or permit the opening of another passage-way to allow the air from one of said receptacles to be exhausted into the outside atmosphere. And another object of my invention is to provide a relatively soft valve, or valve seat of an air valve, whereby the valve is rendered substantially proof against leak and is adapted to securely hold air, or like fluid under pressure, in conjunction with another or auxiliary, relatively refractory or harder valve, and mechanism for moving said valves to open said soft valve, prior to opening said relatively hard valve, and to close said hard valve before closing said soft valve, whereby to protect the sealing surface of the soft valve against injury by the cutting effect produced by the fluids under high velocity by wire drawing, or whistling through relatively small openings between the soft valve and its seat and to more securely effect a seal, by operation of the soft valve.

Other and further objects of my invention will become readily apparent, to persons skilled in the art, from a consideration of the following description when taken in conjunction with the drawings, wherein—

Figure 1 is a central axial section of the valve, on line 1—1 of Fig. 2. Fig. 2 is a similar section, on line 2—2 of Fig. 1. Fig. 3 is a transverse section, on line 3—3 of Fig. 2. Fig. 4 is a similar section, on line 4—4 of Fig. 2.

In all the views the same reference characters are employed to indicate similar parts.

A casing 5 is provided with four chambers 6, 7, 8 and 9 in axial relation. Chambers 7 and 8 are divided by a ported partition 10 having a valve seat 11 and chambers 8 and 9 are divided by a ported partition 12, having a valve seat 13. A hollow plug 14 has screw threaded engagement with the bottom of the casing and is centrally screw threaded for an inlet air supply pipe 15. The upper end of the casing is provided with a laterally projecting arm 16, in the free end of which is pivoted a foot lever 17, as at 18. Projecting from the upper end of the casing is a hollow boss 19, in which a valve plug 20 may be freely reciprocated. The plug 20 is grooved in its side surface, as at 21, so as to provide a free and uninterrupted connection from the chamber 6 to the outside atmosphere. The plug 20 is also provided with a head 22 and an open helical spring 23 which engages the head 22 and rests on the shoulder 24 of the casing 5, so as to hold the lever 17 and the plug 20 yieldingly in elevated positions, as shown in Fig. 1. The plug 20 carries on its lower end a valve 25 which is adapted to make contact with the valve seat 26, carried on the upper end of the hollow sleeve 27. The sleeve 27 is freely reciprocatable in the chamber 6 and the interior axial opening 28 communicates with the chamber 7, through transverse bores or openings 29 made through the wall of the sleeve, so that when the valve 25 is on its seat 26, communication between chambers 6 and 7 is thereby closed, and when the valve is off of its seat, free communication takes place between the interior of the sleeve 27 and the transverse bores 29, thereby to vent the outlet opening 15'. A stem 30 connects the sleeve 27 with a valve 31. The stem may be either a part of either of the structures or separable therefrom, as desired. The seat portion 32, of the valve 31, is preferably of soft material, such as partially vulcanized rubber, or the like, so as to provide a very close fitting yielding connection between the seat portion 32 and the fixed seat 10. Of course an equivalent of this would be to make the part 32 of relatively hard material and the seat 10 of the soft yielding material, but it is mechanically more convenient to provide the soft seat upon the moving stem or valve portion of the device. When the soft seat 32 is firmly pressed into contact with the seat 10, it will yield, more or less, and provide an absolutely tight joint, much tighter than if both parts, the valve and the seat, were of relatively hard material.

Projecting below the valve 31 is a rather large stem 33 provided with a shoulder 34 at the conjunction with a smaller stem 35. Around the smaller stem 35 and resting against the shoulder 34, is an open helical spring 36, the other end of which bears against auxiliary valve 37, that is located immediately below said spring. This spring operates to raise the valve 31 to its seat and to maintain the hollow sleeve 27 in its uppermost position as shown in Fig. 1. The valve 37 is guided in the chamber 9 by the depending side wings or blades 38, as usual with such valves, so as to prevent angular displacement of the valve with reference to its seat, 13. The valve 37 is normally held elevated or closed by means of a relatively strong spring 39, having its lower end resting upon the shoulder 40, of the casing 5, and its upper end pressing against the under surface of the valve 37. A pipe 42 is connected to the outlet opening 15' of the chamber 7 and a lug 43 is provided to connect the device to any proper support.

The use and operation of the device is as follows; Assume that the source of air supply under relatively high pressure is connected with the inlet opening of the structure by means of the pipe 15 and that it is desirable to connect the air supply, through the valve, with a suitable receptacle, by the pipe 42, and assume further that it is desirable to exhaust the receptacle of its supply of compressed air, so soon as the source of supply has been shut off, by means of the two valves controlling said supply. To connect the receptacle to the source of air supply the lever 17 is depressed against the resilient action of the spring 24 as when the lever comes in contact with the head 22 of the plug 20. This operation first closes the vent valve 25 when it is forced into contact with its seat 26, thereby closing the chamber 7 from the outside atmosphere, a further depression of the lever 17, opens the valves 31 and 37 in the order named, first opening valve 31 and when the end of the stem 35 strikes the valve 37, this valve, by a continued downward depression of the lever 17 is opened against the resilient effect of the spring 39. The path of the air through the valve structure is from the chamber 9, through the port between the chamber 9 and the chamber 8, which is opened subsequent to the opening of the valve 31, just above, into the chamber 8 and through the port between chambers 8 and 7, into the chamber 7, and from thence through the outlet opening 15' and the pipe 42 to the receptacle to which compressed air is to be supplied. Now when the lever 17 is released of its foot pressure, that was necessary to open the admission valves, the spring 39 will automatically lift the valve 37 and the spring 36 will cause the valve 31 to follow up this action until the soft portion 32, of the valve 31, seats upon the seating surface 11 of the partition 10, thereby closing the port of the soft valve, and making a complete air tight joint between the chambers 7 and 8, and prohibiting further movement of air from the source of supply into the receptacle, the air pressure serving to more firmly hold valves 31 and 37 closed. Now, when foot pressure upon the lever 17 is completely withdrawn, the spring 21 will lift the plug 20 and the vent valve 25 from its seat 26 opening the port and once more permitting communication of the chamber 7 with the outside atmosphere. The supply pipe 42 connects chamber 7 with the receptacle, and thus the supply of compressed air which has been previously delivered to the receptacle from the source of supply by operation of the plural valve may be exhausted, into the outside atmosphere, and the receptacle will be normally free of a charge of compressed air, until the valve is again operated, in the manner heretofore described.

From the foregoing description of operation it will be noted that the soft seat 32, of the valve 31, leaves the valve seat 11 before the valve 37 leaves its seat, and is sufficiently far removed from its seat, before air is admitted into the chamber 8, by the opening of the valve 37, thereby preventing any cutting or abrading effect that may otherwise take place upon the soft surface 32 of the valve 31, and it will be further noted that the auxiliary valve 37 is firmly upon its seat before the soft valve 31 is seated, and therefore a perfect seal is effected by the soft valve, without danger of excessive wear thereof, and that should the harder valve 37 leak, so that air might pass from the chamber 9 to the chamber 8, the soft valve will prevent it from reaching the discharge pipe 42, thus not only closing the passageway by means of a double seal effected by the use of the two valves, but providing one valve of such character that the sealing effect is much more complete, than usual, and which of itself is not sufficiently durable to withstand all of the vicissitudes to which it would be subjected without the coöperation of the associate auxiliary valve.

My plural seal vent valve structure is especially desirable for use in connection with air motors, in engine starting devices, in which it is required that air under pressure shall be held against possibility of leak and in which it is further desirable that the receptacle, into which air is to be directed, such as an air cylinder for moving a piston, for primarily rotating the shaft of an engine to be started, should be exhausted as soon as an impulse of air, introduced into the cylinder, has performed its necessary function.

While I have herein shown a single embodiment of my invention for the purpose of clear disclosure it is evident that changes may be made in the structural arrangement of the parts and in their form and configuration within the scope of the appended claims.

Having described my invention, what I claim is:—

1. In a device of the character described, a casing, having an inlet and an outlet opening; three valves therein, two of which are located intermediate said openings and normally closed; means to automatically close the last two mentioned valves subsequent to their opening, one after the other; the other valve serving as a vent for the outlet opening and normally open; means to automatically open the vent valve after the other two valves have been closed, and manual means to close the vent valve and open the other two valves.

2. In a device of the character described, a casing, having an inlet and an outlet opening; three valves therein, two of which are located intermediate said openings and normally closed; means to automatically close the last two mentioned valves subsequent to their opening, one after the other; the other valve serving as a vent for the outlet opening and normally open; independent means to automatically open the vent valve after the other two valves have been closed and manual means to first close the vent valve and then open the other two valves, one after the other.

In testimony whereof I hereunto set my hand in the presence of two subscribing witnesses.

JOHN DESMOND.

In the presence of—
 FRANK ALBUS,
 GRACE BURTON.